(Model.)

3 Sheets—Sheet 2.

W. P. CLARK.
COMBINED SODA WATER APPARATUS AND TUMBLER WASHER.

No. 248,917.  Patented Nov. 1, 1881.

WITNESSES,
John T. Whitman
Chas. E. C. Breck

INVENTOR,
William P. Clark
By Porter & Hutchinson, Attys.

(Model.)
W. P. CLARK.
COMBINED SODA WATER APPARATUS AND TUMBLER WASHER.
No. 248,917. Patented Nov. 1, 1881.
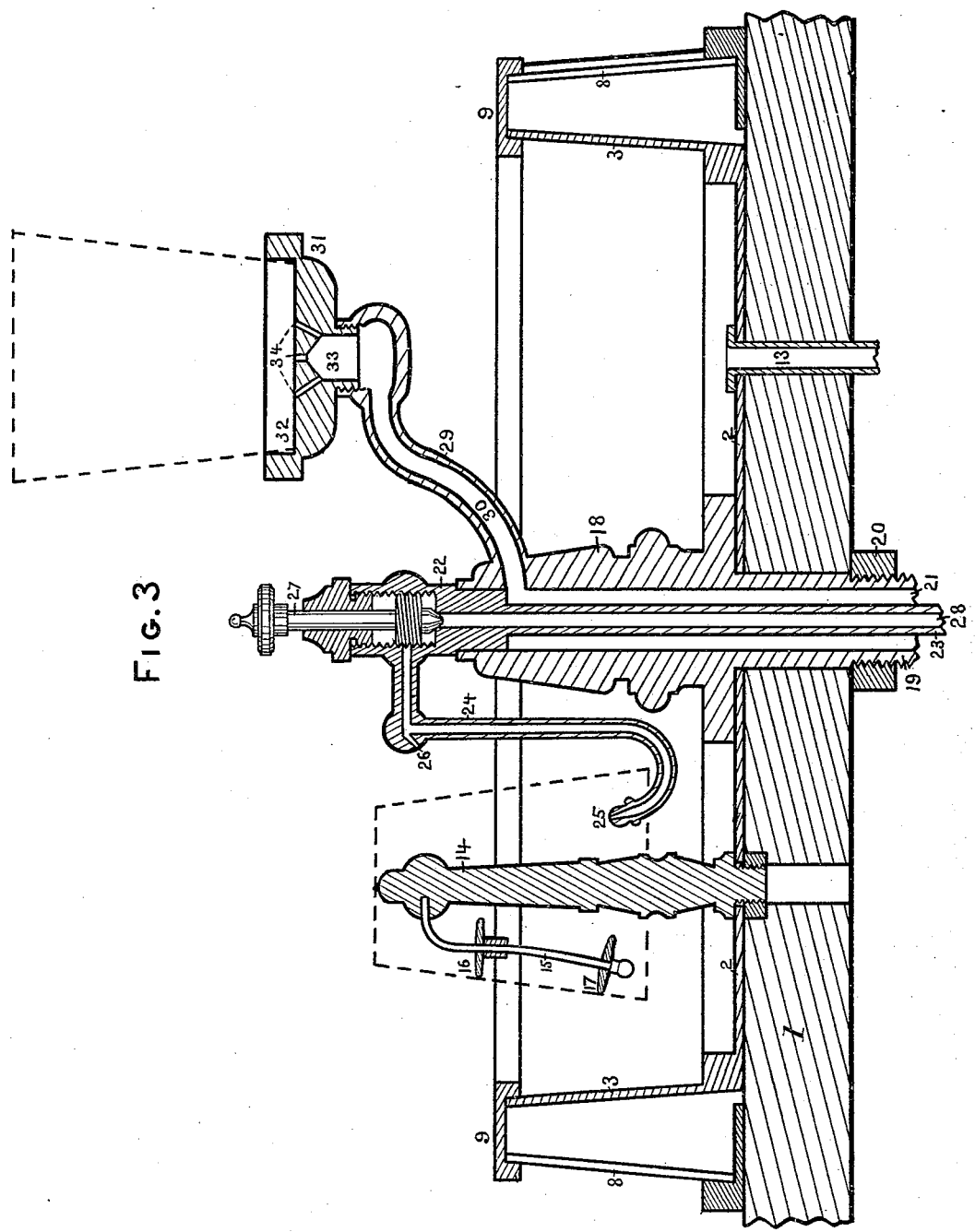
WITNESSES,
John T. Whitman
Chas. E. C. Breck
INVENTOR,
William P. Clark
By Porter & Hutchinson, Attys.

UNITED STATES PATENT OFFICE.

WILLIAM P. CLARK, OF MEDFORD, MASSACHUSETTS.

COMBINED SODA-WATER APPARATUS AND TUMBLER-WASHER.

SPECIFICATION forming part of Letters Patent No. 248,917, dated November 1, 1881.

Application filed March 12, 1880. (Model.)

*To all whom it may concern:*

Be it known that I, WILLIAM P. CLARK, of the town of Medford, State of Massachusetts, have invented Improvements in Combined Soda-Water Apparatus and Tumbler-Washer, of which the following is a specification.

This invention relates to apparatus by which soda-water is dispensed to consumers thereof, and to the apparatus by which the tumblers or other vessels employed in such dispensing are cleansed after being so used; and the invention will, in connection with the accompanying drawings, be hereinafter fully described, and specifically defined in the appended claims.

Figure 1:
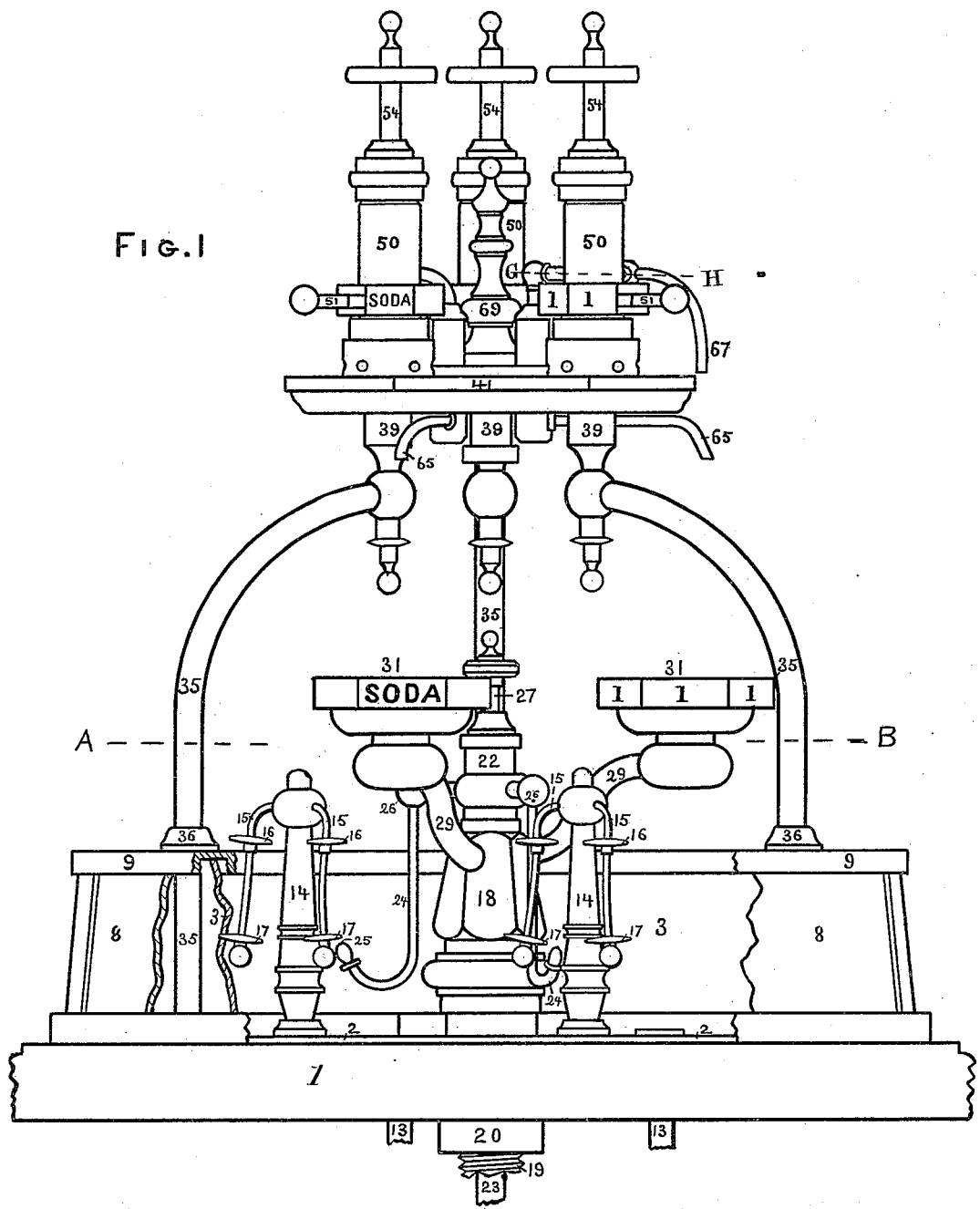
Figure 2:
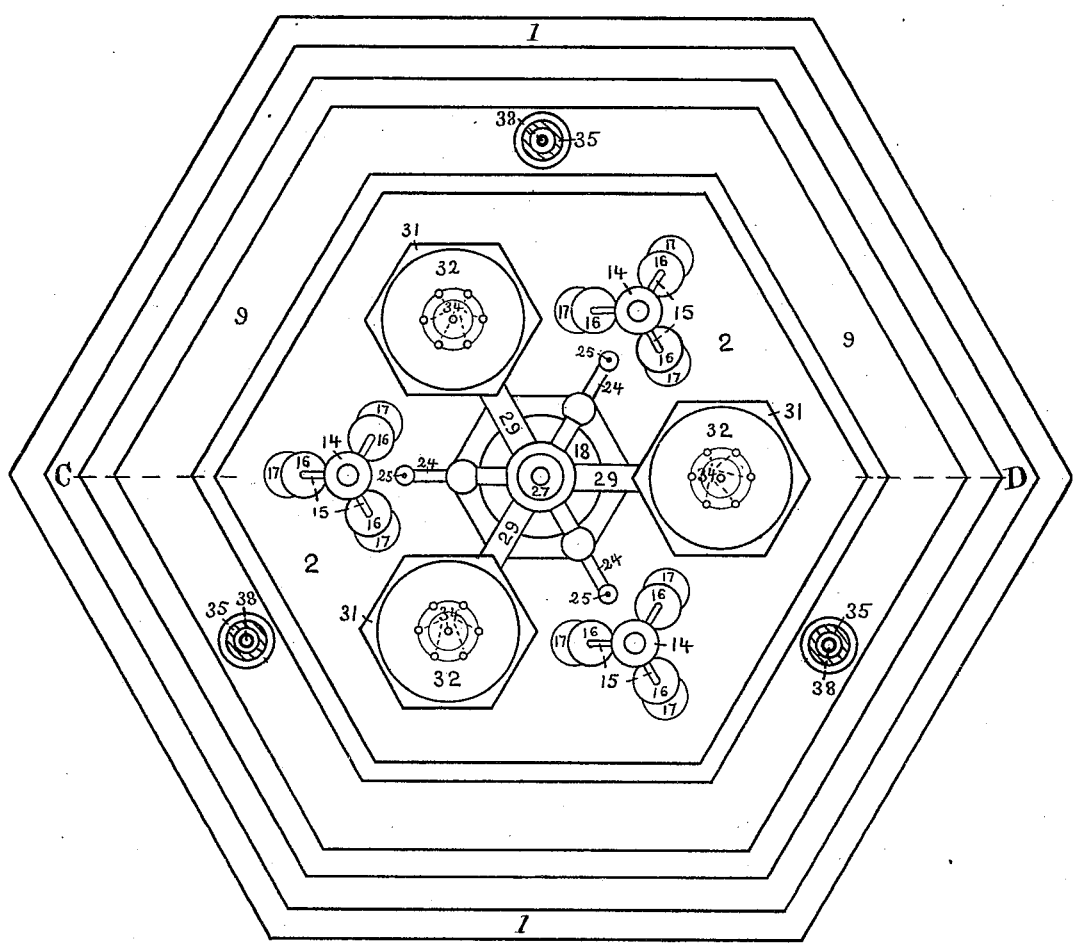

Figure 1 is a side elevation of an apparatus embodying my invention, the near side of the water-basin being shown as broken away, the better to show the interior parts and their arrangement. Fig. 2 is a top or plan view of the water-basin and its attachments, all of the apparatus above line A B, Fig. 1, which is supported by the curved tubular pillars being broken away or omitted, and said pillars, being shown in transverse section. Fig. 3 is a vertical section as taken on line C D, Fig. 2, and through the axis of one of the tumbler-washer standards and one of the tumbler-supports of the draft apparatus, the extremities of the marble base being broken away.

In said views is shown a marble slab, (marked 1,) which constitutes the common base, upon which all the other parts rest. A water-basin resting on said base is formed with a bottom, 2, an interior wall, 3, an exterior wall, 8, and a cap-band, 9, within which are placed the tumbler-washers and the tumbler-rests, as will be presently described; but the peculiar construction of said basin constitutes no part of my present invention, and it may be of any kind or form of construction which will subserve the intended purpose. Outlet-pipes 13, Figs. 1 and 3, are secured in the bottom 2 of said basin, and serve to carry off the water that falls therein.

The tumbler-washers are briefly described as follows: Standards 14 are firmly secured to bottom 2 of the basin, as shown in Fig. 3, and to each standard three equidistant depending rigid arms, 15, are secured, and on each said arms are arranged to revolve freely the upper rollers, 16, and the lower rollers, 17, as shown, the head of standards 14 being rounded to serve as a central pivot for the inverted tumbler, as shown by dotted lines in Fig. 3, the rollers on the arms serving to retain the tumbler centrally on said pivot. A hollow standard, 18, is secured centrally in said basin by its extension 19, which passes down through bottom 2 and slab 1, and is fastened by the locking-nut 20, as shown in Fig. 3. In the axial passage 21 in said standard is placed the valve-body 22, which closely fits said passage at its top, and from which extends downward the diminished tubular part 23, as shown. The curved tubular arms 24, secured in valve-body 22, are provided with the axial orifice 25 and the transverse orifice 26, and are so curved and arranged relatively to standards 14 that when the inverted tumbler is seated thereon, as shown, the axial jet will be delivered within and the transverse jet without upon such tumbler, and as the cylindrical valve-body 22 is fitted so that it may be circumferentially adjusted in standard 18, therefore arms 24 may be thereby so adjusted as to deliver their jets of water upon the tumbler at any desired degree of obliquity thereto, and thus cause it to rotate it at any desired velocity. Water for so cleansing the tumblers is introduced through axial passage 28 in said tube 23, whence it flows into the axial chamber in valve-body 22, and is controlled by actuating the valve-stem 27, the head whereof is threaded in said body, and is thereby raised or lowered in the usual manner. In said central standard, 18, are secured three radial arms, 29, having an axial passage, 30, connecting with passage 21 in said standard, and at their outer ends having the tumbler-rests 31, as shown in Fig. 3, said rests having the upper concentric recess or tumbler-seat, 32, while beneath, in their central stem, is the small chamber 33, into which converge the small drainage-passages 34. When the beverage is being drawn the tumbler is seated in recess 32, and all overflow or waste is caught in said rest, and will escape through passages 34 and 30 into standard 18, whence it may be conducted away by a pipe arranged in any of the well-known methods.

The draft apparatus is arranged and supported as follows: Three curved tubular pillars, 35, are secured in the wall of the basin, as shown, and upon the upright ends 39 of these pillars the elevated bed-plate 41 is secured and supported. Upon said bed-plate are mounted the draft-cocks 50, which are supplied through the small pipes 38, Fig. 2, which pass up through said pillars, and are connected with said draft-cocks and arranged to be coupled to the supply-fountain at their lower ends. The draft-nozzles 65 and 67 of said draft-cocks are arranged to deliver the liquid into the tumblers when seated in tumbler-rests 31, and the flow of said beverage through cocks 50 is regulated by the valves 54 in the usual manner. By thus arranging the tumbler-washers within the basin and the draft-cocks above the same great economy of space is obtained, and by arranging said cocks upon a common bed supported by pillars a light airy appearance is imparted to the apparatus, and the view is but slightly impeded, while the arrangement of the tumbler-washers between the tumbler-rests serves both to economize space and to the convenient operation of the apparatus.

It will be obvious that any desired number of washers, tumbler-rests, and draft-cocks may be embodied in this apparatus as the required capacity may demand, and that the tumbler-washer stands, as also the draft-cocks, may be of such construction as shall best subserve the purpose desired.

I claim as my invention—

1. The combination of central standard, 18, constructed and arranged to serve as the drainage-conduit of the tumbler-rests, with said rests radiating from said standard, and the inlet-conduit of the tumbler-washers arranged within said standard, substantially as specified.

2. The combination and arrangement, upon a common and portable bed, of a soda-water-dispensing apparatus and tumbler-washers, provided with water-jet conduits leading up through such bed, and supports for the inverted tumblers, substantially as specified.

3. The combination of a soda-water-dispensing apparatus and tumbler-washers, provided with supports for the inverted tumblers, and conduits to deliver water-jets upon such tumblers, when arranged upon a common bed and one above the other, substantially as specified.

4. In combination with a soda-water apparatus, mounted upon and supported by the overarching pillars, the tumbler-washers provided with water-jet conduits and supports arranged in the basin within such overarching pillars and beneath the apparatus thereby supported, substantially as specified.

5. The combination of a water-basin and the tubular supporting-pillars secured in and supported by the wall of such basin with the soda-water apparatus mounted upon and with supply-pipes inclosed in said pillars, and with the tumbler-washers, with their water-jet conduits and supports, arranged in such basin below the draft apparatus, substantially as specified.

6. In a soda-water apparatus, the combination of the draft-cocks or valvular devices and their conduits and connections for controlling the flow of such beverage with a tumbler-washer and self-draining tumbler-rests, all arranged upon a common bed-plate or support, substantially as specified.

7. The combination of the self-draining tumbler-rests with the central standard, arranged to serve as the support and outlet-conduit of said rests, and with the tumbler-washer inlet-conduit, arranged within said standard and provided with suitable jet-delivery arms, substantially as specified.

8. The combination of a plurality of tumbler-rests arranged around a common center with the conduits and valvular devices, and with corresponding tumbler-washers arranged around such center between the tumbler-rests, substantially as specified.

9. In combination, a portable water-basin, a soda-water-dispensing apparatus arranged above and supported by said basin, tumbler-washers arranged in said basin, self-draining tumbler-rests, and a central standard arranged to serve as the support and drainage-conduit of the tumbler-rests, substantially as specified.

WILLIAM P. CLARK.

Witnesses:
T. W. PORTER,
JOHN T. WHITMAN.